United States Patent
Kim

(10) Patent No.: US 11,049,305 B2
(45) Date of Patent: Jun. 29, 2021

(54) ELECTRONIC APPARATUS IDENTIFYING IMAGE ARRANGEMENT ON LAYOUT, CONTROLLING METHOD OF ELECTRONIC APPARATUS AND COMPUTER READABLE MEDIUM

(71) Applicant: Samsung Electronics Co., Ltd., Suwon-si (KR)

(72) Inventor: Donghyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/583,470

(22) Filed: Sep. 26, 2019

(65) Prior Publication Data
US 2020/0118316 A1    Apr. 16, 2020

(30) Foreign Application Priority Data
Oct. 11, 2018    (KR) .................... 10-2018-0121158

(51) Int. Cl.
*G06T 11/60*    (2006.01)
*G06T 3/40*    (2006.01)
*G06T 3/00*    (2006.01)

(52) U.S. Cl.
CPC ............ *G06T 11/60* (2013.01); *G06T 3/0012* (2013.01); *G06T 3/40* (2013.01); *G06T 2200/24* (2013.01)

(58) Field of Classification Search
CPC ......... G06T 11/60; G06T 3/0012; G06T 3/40; G06T 2200/24
See application file for complete search history.

(56) References Cited

U.S. PATENT DOCUMENTS

| | | | |
|---|---|---|---|
| 6,714,692 B1 * | 3/2004 | Kim | G06T 3/4007 382/299 |
| 7,532,771 B2 | 5/2009 | Taylor et al. | |
| 9,983,760 B2 | 5/2018 | Min | |

(Continued)

FOREIGN PATENT DOCUMENTS

| | | |
|---|---|---|
| JP | 2008-217479 | 9/2008 |
| KR | 10-1414195 | 7/2014 |

(Continued)

OTHER PUBLICATIONS

Extended European Search Report dated Feb. 20, 2020 in European Patent Application No. 19202305.9.

(Continued)

*Primary Examiner* — Jitesh Patel
(74) *Attorney, Agent, or Firm* — Staas & Halsey LLP

(57) ABSTRACT

An electronic apparatus including a memory, and a processor to determine arrangement of a plurality of images for a plurality of regions that are divided according to a predetermined layout, store information on the determined arrangement in the memory, and control the electronic apparatus to display the plurality of images in the plurality of regions based on the stored information on the determined arrangement, and the processor may determine arrangement of the plurality of images, based on a level of importance of at least one object region determined on a basis of a category of the at least one object region included in the plurality of images and a degree of loss of the at least one object region according to the level of importance.

19 Claims, 15 Drawing Sheets

(56) References Cited

U.S. PATENT DOCUMENTS

| | | | |
|---|---|---|---|
| 2007/0065044 A1* | 3/2007 | Park | G06K 9/00228 382/305 |
| 2008/0068374 A1* | 3/2008 | Fukushima | H04N 5/23293 345/419 |
| 2009/0034842 A1* | 2/2009 | Grosvenor | H04N 1/3872 382/173 |
| 2009/0097748 A1* | 4/2009 | Lee | G06F 16/434 382/173 |
| 2011/0242311 A1* | 10/2011 | Miyajima | G06K 9/00805 348/116 |
| 2012/0278704 A1* | 11/2012 | Ying | G06F 40/166 715/243 |
| 2014/0126826 A1* | 5/2014 | Yabu | G06K 9/00536 382/190 |
| 2014/0254940 A1* | 9/2014 | Shiiyama | G06K 9/4671 382/201 |
| 2015/0161466 A1* | 6/2015 | Welinder | G06T 11/60 382/195 |
| 2015/0310585 A1* | 10/2015 | Gupta | G06T 7/11 382/199 |
| 2016/0028999 A1* | 1/2016 | Ptucha | G06T 11/60 348/207.1 |
| 2016/0248993 A1 | 8/2016 | Sato | |
| 2016/0299893 A1 | 10/2016 | Zhao et al. | |
| 2016/0350932 A1* | 12/2016 | Kim | G06K 9/00228 |
| 2016/0357717 A1 | 12/2016 | Metz et al. | |
| 2016/0371867 A1 | 12/2016 | Diverdi et al. | |
| 2018/0027268 A1 | 1/2018 | Cheng | |
| 2018/0150433 A1 | 5/2018 | Sowden et al. | |

FOREIGN PATENT DOCUMENTS

| | | |
|---|---|---|
| KR | 10-1433986 | 8/2014 |
| KR | 10-1719291 | 3/2017 |

OTHER PUBLICATIONS

Florian Schroff, et al.,"FaceNet: A Unified Embedding for Face Recognition and Clustering," in Proceedings of the IEEE Conference on Computer Vision and Pattern Recognition, 2015.

Harold W. Kuhn, "The Hungarian Method for the Assignment Problem", Naval Research Logistics Quarterly, 2: 83-97, 1955.

Jia Deng, et al., "ImageNet: A Large-Scale hierarchical Image Database," in Proceedings of the IEEE Conference on Computer Vision and Pattern Recognition, 2009.

Communication pursuant to Article 94(3) EPC dated Mar. 30, 2021, in corresponding European Patent Application No. 19 202 305.9.

* cited by examiner

☐ OBJECT REGION(14)

FIG. 8

| Pic # \ Layout # | 1 | 2 | 3 | 4 | 5 | 6 | 7 |
|---|---|---|---|---|---|---|---|
| 1 | (5.1) | 11.3 | 19.6 | 41.8 | 17.2 | 4.7 | 27.1 |
| 2 | 6.4 | 12.1 | 31.2 | 52.6 | 30.7 | (1.5) | 41.4 |
| 3 | 6.8 | 8.3 | 10.4 | 36.7 | 9.1 | 4.2 | (11.2) |
| 4 | 6.1 | 7.2 | (9.7) | 30.2 | 8.7 | 0.8 | 10.9 |
| 5 | 5.4 | 7.3 | 10.6 | (21.1) | 8.4 | 2.2 | 17.3 |
| 6 | 6.9 | (7.1) | 10.4 | 24.8 | 8.7 | 2.9 | 21.2 |
| 7 | 5.7 | 6.8 | 10 | 31.7 | (7.3) | 3 | 12 |

ELECTRONIC APPARATUS IDENTIFYING IMAGE ARRANGEMENT ON LAYOUT, CONTROLLING METHOD OF ELECTRONIC APPARATUS AND COMPUTER READABLE MEDIUM

CROSS-REFERENCE TO RELATED APPLICATION

This application is based on and claims priority under 35 U.S.C. § 119(a) of a Korean Patent Application number 10-2018-0121158, filed on Oct. 11, 2018, in the Korean Intellectual Property Office, and the disclosure of which is incorporated by reference herein in its entirety.

BACKGROUND

1. Field

The disclosure relates to an electronic apparatus for automatically editing and arranging a plurality of images and a controlling method thereof and, more particularly, to an electronic apparatus to minimize a degree of loss of an object region included in a plurality of images, in arranging a plurality of images based on a predetermined layout, and a controlling method thereof.

2. Description of Related Art

A general person who is not a professional can easily edit an image due to development and commercialization of an image processing technology, and it has been a common practice for an individual to simply edit a daily image directly photographed by the individual and unveil the daily image through social network services/sites (SNS).

In particular, a layout to enable a user to simply edit and arrange one or more images has been provided, and various applications enabling an image to be arranged on the corresponding layout have been provided.

Conventionally, in arranging a plurality of images in a plurality of regions in a layout, images are edited in sequence in each of the plurality of regions in the order in which a user selected the images, or arrangement of the images has been determined based solely on a connection relation among the images. As a result, an object region, which is a relatively important part of each image, is frequently cut off.

SUMMARY

The disclosure is to address at least the above-mentioned problems and/or disadvantages and to provide at least the advantages described below. The object of the disclosure is to provide an electronic apparatus and a controlling method thereof, to identify an object region included in a plurality of images and determine arrangement so that a loss of an object region is minimized, in arranging a plurality of images according to a predetermined layout.

In addition, the object of the disclosure is to provide an electronic apparatus and a controlling method thereof, to determine a level of importance of each of an object region, based on a user's selection and/category, and arrange a plurality of images according to a layout based thereon.

According to an embodiment, an electronic apparatus includes a memory, and a processor to determine arrangement of a plurality of images for a plurality of regions that are divided according to a predetermined layout, store information on the determined arrangement in the memory, and control the electronic apparatus to display the plurality of images in the plurality of regions based on the stored information on the determined arrangement, and the processor may determine arrangement of the plurality of images, based on a level of importance of at least one object region corresponding to a category of the at least one object region included in the plurality of images and a degree of loss of the at least one object region according to the level of importance.

The processor may obtain an interest value that reflects the level of importance for a unit area of the object region, and in arranging the plurality of images in the plurality of regions, determine arrangement of the plurality of images so that the degree of loss of the obtained interest value is minimized.

The processor may, in arranging a first image, from among the plurality of images, in each of the plurality of regions, identify arrangement of the first image so that the degree of loss of the interest value corresponding to the object region included in the first image is minimized, and identify the degree of loss of the interest value according to the arrangement of the first image, and determine arrangement of the plurality of images based on the identified arrangement of the first image and the degree of loss.

The processor may, in arranging a second image, from among the plurality of images in each of the plurality of regions, identify arrangement of the second image so that a degree of loss of the interest value corresponding to the object region included in the second image is minimized, and identify the loss of the interest value according to the arrangement of the second image, and determine arrangement of the plurality of images based on the identified arrangement of the second image and the degree of loss.

The processor may determine a level of importance of each of the object region based on a number of an object region corresponding to each of categories, from among the object regions included in the plurality of images.

The processor may obtain a ratio of an object region corresponding to each of the category, from among the object regions included in the plurality of images, and determine a level of importance of an object region corresponding to a category of which the obtained ratio is highest among the categories, from among the object regions included in the plurality of images, to be highest.

The processor may determine a level of importance of the object region based on a user input to select at least one of categories of the object regions included in the plurality of images.

The processor of the electronic apparatus may store information on the user input to select at least one of categories of the object region included in the plurality of images in the memory, and in determining arrangement of a plurality of other images of a plurality of regions divided according to a predetermined layout, determine a level of importance of the object region included in the plurality of other images based on the categories of the at least one object region included in the plurality of other images and the stored information on the user input.

The processor may reduce or enlarge the first image based on a size of each of the plurality of regions, while maintaining an aspect ratio of the first image, and in response to an aspect ratio of each of the plurality of regions being different from the aspect ratio of the first image, in arranging only a portion corresponding to a size of each of the plurality of regions, from the reduced or enlarged first image, in each of the plurality of regions, identify arrangement of the first image so that a degree of loss of the interest value corresponding to the object region included in the first image is minimized.

According to an embodiment, a controlling method of an electronic apparatus includes determining arrangement of a plurality of images for a plurality of regions that are divided according to a predetermined layout, and controlling the electronic apparatus to display the plurality of images in the plurality of regions based on the determined arrangement, and the determining arrangement of a plurality of images may include determining arrangement of the plurality of images, based on a level of importance of at least one object region corresponding to a category of the at least one object region included in the plurality of images and a degree of loss of the at least one object region according to the level of importance.

The determining arrangement of a plurality of images may include obtaining an interest value that reflects the level of importance for a unit area of the object region, and in arranging the plurality of images in the plurality of regions, determining arrangement of the plurality of images so that the degree of loss of the obtained interest value is minimized.

The determining arrangement of a plurality of images may include, in arranging a first image, from among the plurality of images, in each of the plurality of regions, identifying arrangement of the first image so that the degree of loss of the interest value corresponding to the object region included in the first image is minimized and identifying the degree of loss of the interest value according to the arrangement of the first image, and determining arrangement of the plurality of images based on the identified arrangement of the first image and the degree of loss.

The determining arrangement of a plurality of images may include, in arranging a second image, from among the plurality of images in each of the plurality of regions, identifying arrangement of the second image so that a degree of loss of the interest value corresponding to the object region included in the second image is minimized and identifying the loss of the interest value according to the arrangement of the second image, and determining arrangement of the plurality of images based on the identified arrangement of the second image and the degree of loss.

The determining arrangement of a plurality of images may include determining a level of importance of each of the object region based on a number of an object region corresponding to each of categories, from among the object regions included in the plurality of images.

The determining arrangement of a plurality of images may include obtaining a ratio of an object region corresponding to each of the categories, from among the object regions included in the plurality of images, and determining a level of importance of an object region corresponding to a category of which the obtained ratio is highest among the categories, from among the object regions included in the plurality of images, to be highest.

The determining arrangement of a plurality of images may include determining a level of importance of the object region based on a user input to select at least one of categories of the object regions included in the plurality of images.

The determining arrangement of a plurality of images may include storing information on the user input to select at least one of categories of the object region included in the plurality of images in the memory, and in determining arrangement of a plurality of other images of a plurality of regions divided according to a predetermined layout, determining a level of importance of the object region included in the plurality of other images based on the categories of the at least one object region included in the plurality of other images and the stored information on the user input.

The determining arrangement of a plurality of images may include reducing or enlarging the first image based on a size of each of the plurality of regions, while maintaining an aspect ratio of the first image, and in response to an aspect ratio of each of the plurality of regions being different from the aspect ratio of the first image, in arranging only a portion corresponding to a size of each of the plurality of regions, from the reduced or enlarged first image, in each of the plurality of regions, identifying arrangement of the first image so that a degree of loss of the interest value corresponding to the object region included in the first image is minimized.

According to an embodiment, a non-transitory computer readable medium storing computer instructions executed by a processor of an electronic apparatus to make the electronic apparatus perform operations includes determining arrangement of a plurality of images for a plurality of regions that are divided according to a predetermined layout; and controlling the electronic apparatus to display the plurality of images in the plurality of regions based on the determined arrangement, and the determining arrangement of a plurality of images may include determining arrangement of the plurality of images, based on a level of importance of at least one object region corresponding to a category of the at least one object region included in the plurality of images and a degree of loss of the at least one object region according to the level of importance.

According to the embodiment, an electronic apparatus and a controlling method thereof may automatically determine an arrangement which enables a loss of an object region to be minimized in arranging a plurality of images according to a predetermined layout, thereby increasing convenience of a user.

In particular, since a level of importance of each object region is determined on the basis of a user's selection and/or a category, and a degree of loss of the object region to which the level of importance is reflected is considered, an optimal image arrangement, to which elements desired by a user are reflected in arranging a plurality of images according to a layout, may be determined.

BRIEF DESCRIPTION OF THE DRAWINGS

The above and other aspects, and advantages of certain examples of the disclosure will be more apparent from the following description taken in conjunction with the accompanying drawings, in which:

FIG. 8 is a table describing a minimum loss value of an interest value, in arranging each image in each of a plurality of regions, to describe a case in which loss of an interest value is minimized, in arranging a plurality of images in a plurality of regions;

DETAILED DESCRIPTION

Figure 1:
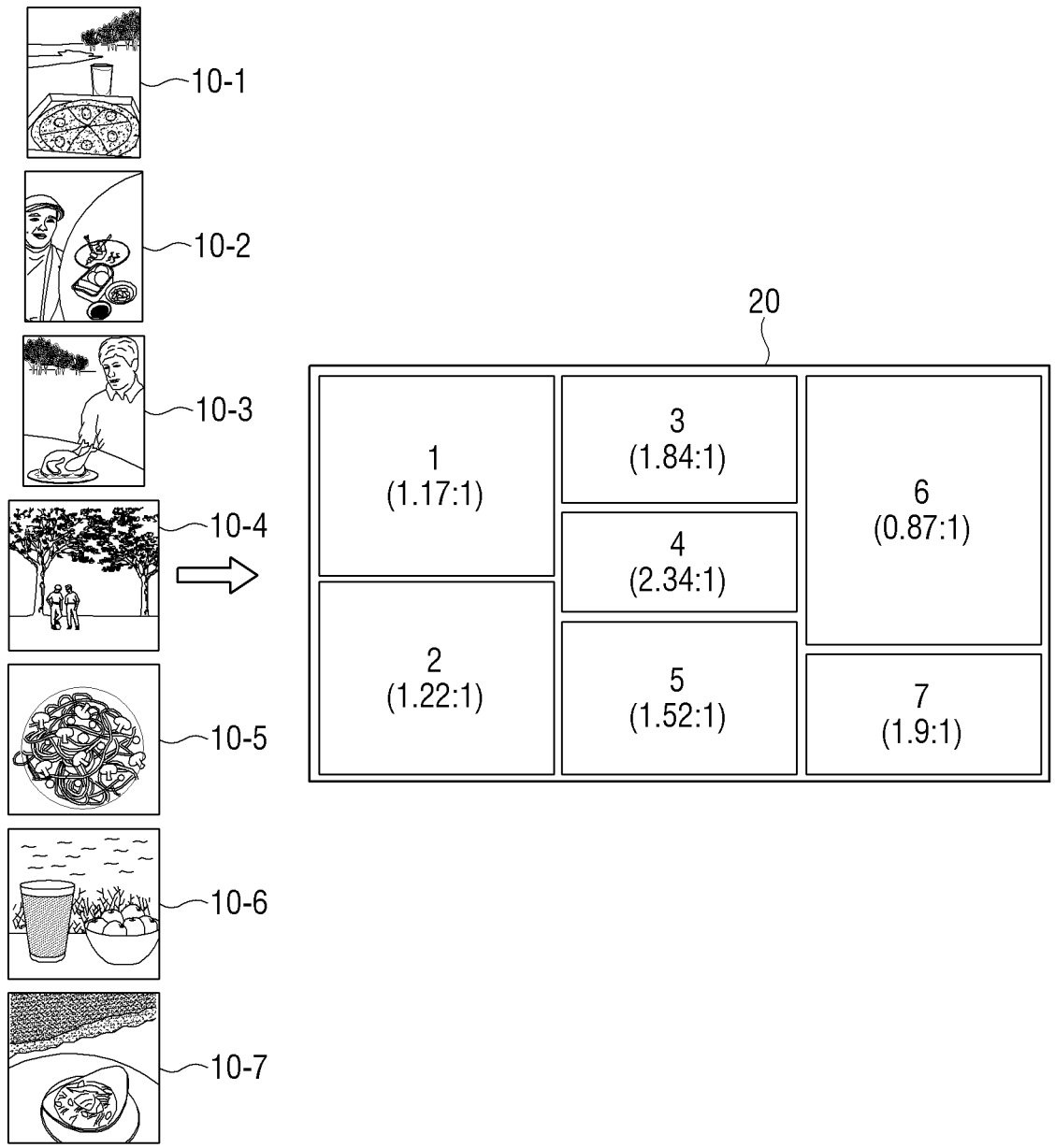
FIG. 1 introduces a plurality of images and a layout to describe an electronic apparatus, according to various embodiments.

Before specifically describing the disclosure, a method for demonstrating the present specification and drawings will be described.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules". "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

FIG. 1 introduces a plurality of images and a layout to describe an electronic apparatus and a controlling method of the electronic apparatus, according to various embodiments.

Referring to FIG. 1, seven images 10-1, 10-2, . . . , 10-7 and a layout 20 divided into seven regions may be identified. For each of the seven regions in the layout 20, orders 1 to 7 are defined, and respective aspect ratios (for example, 1.17:1) are indicated.

The disclosure relates to an electronic apparatus for determining (or identifying) the arrangement of a plurality of images for a plurality of regions divided according to a layout and a controlling method thereof. Hereinbelow, along with the description of the technology, an example of a detailed process for arranging seven images 10-1, 10-2, . . . , 10-7 as illustrated in FIG. 1 in seven regions that are divided according to the layout 20 will be described.

Figure 2:
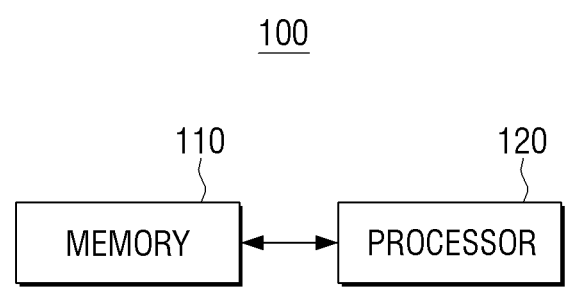
FIG. 2 is a block diagram to describe a configuration of an electronic apparatus, according to an embodiment.

FIG. 2 is a block diagram to describe a configuration of an electronic apparatus 100, according to an embodiment.

An electronic apparatus 100 may be a display device which is implemented as a terminal device such as a mobile phone, a smart phone, or the like, or may display one or more images such as a TV, a smart TV, a notebook PC, a desktop PC, a tablet PC, a kiosk, and a monitor. In addition, the electronic apparatus 100 may be implemented as a set-top box, an on the top (OTT), or a server, and may transmit data on an image to an external device wirelessly or by wire so that an external device including a display may display one or more images.

Referring to FIG. 2, the electronic apparatus 100 may include a memory 110 and a processor 120.

The memory 110 is a configuration to store an instruction or data related to an element of an operating system (OS) and the electronic apparatus 100 for controlling an overall operation of the elements of the electronic apparatus 100.

For this, the memory 110 may be implemented as a non-volatile memory (for example, a hard disk, a solid state drive (SSD), and flash memory), a volatile memory, or the like.

The memory 110 may store information on predetermined one or more layouts or information on one or more images.

The layout may mean a method for editing and arranging one or more images. In arranging one or more images on a specific screen, the corresponding screen may be divided into one or more regions according to the layout. In the divided region, an image may be respectively arranged in each of the divided regions, and the same number of images as the number of regions divided according to the layout may be arranged in a region inside the layout. In addition, the arranged image may be displayed through an electronic apparatus 100 or an external device (not shown).

The information on the layout may include the number of regions divided according to a layout, a horizontal/vertical size or a ratio of each region, a position of each region, the number or order of each region, or the like.

The image stored in the memory 110 may be obtained based on image data that is received from an outside through a communicator (not shown), an input/output port (not shown), a broadcast receiver (not shown), or the like, of the electronic apparatus 100. The image may be an image drawn based on a user's manipulation of at least one button, keyboard, mouse, or the like, included in the user inputter (not shown) of the electronic apparatus 100 and/or a user input for a touchpad/panel included in a user inputter (not shown). Alternatively, the image may be an image that is photographed and obtained through at least one camera (not shown) included in the user inputter (not shown) of the electronic apparatus 100.

The memory 110 may store information on the arrangement of a plurality of images divided according to a predetermined layout. Specifically, information on which image is arranged in each of a plurality of divided regions among a plurality of images, a ratio of enlargement/reduction of an image in arranging each image in each region, information on a region in an image which is cut off, in arranging each image in each region, may be stored. At this time, the arrangement of the plurality of images may be determined by the processor 120.

In addition, the memory 110 may store information on an object included in each image, information on a category of each object region, information on a category selected by a user, or the like. This will be described along with an operation of the electronic apparatus 100 which will be illustrated and described through FIGS. 3 and 4.

The processor 120 may control an overall operation of the electronic apparatus 100.

For this purpose, the processor 120 may include a random access memory (RAM) (not shown), a read only memory (ROM) (not shown), a central processing unit (CPU) (not shown), a graphic processing unit (GPU) (not shown), a system bus (not shown), or the like, and may perform operation or data processing related to control of other elements included in the electronic apparatus 100.

The processor 120 may determine (or identify) the arrangement of a plurality of images for a plurality of regions divided according to a predetermined layout. At this time, the processor 120 may determine the arrangement of the plurality of images temporarily or non-temporarily stored in the memory 110, or may determine the arrangement of the plurality of images stored in an external device (not shown) using information on at least one of an identification number, a size, an object, and a category of a plurality of images stored in an external device (not shown). The processor 120 may store the information on the plurality of determined images on the memory 110.

At this time, the processor 120 may determine the arrangement of the plurality of images based on the level of importance of the object region on the basis of the category of the at least one object region included in the plurality of images and the degree of loss of at least one object region according to the level of importance.

In this case, the processor 120 may determine (or identify) the level of importance of the object region based on the category of at least one object region included in the plurality of images, first. In arranging the plurality of images in the plurality of regions, it is possible to determine the arrangement of the plurality of images with respect to the plurality of regions based on the degree of loss of at least one object region according to the level of importance.

The object region may be a region including an object having a high weight in an image or a region including a predetermined object. The object region does not necessarily have to be one for each image, and may be no or at least two for a specific image.

In general, an object region is considered a relatively important region in an image, and thus, there is a need to reduce the degree of loss in editing and arranging a plurality of images to correspond to a plurality of regions divided according to a layout.

The processor 120 may extract an object region using information on colors and edge of each of a plurality of images.

For example, the processor 120 may detect an edge in an image based on a Canny algorithm, Sobel algorithm, or the like. The detected edge is a high frequency component which sensitively reacts to human visual perception ability, and thus is suitable as an element for detecting an object region.

The processor 120 may identify the color distribution of a nearby region around the detected edge. Specifically, the processor 120 may obtain an average value of color values (at least one of red, green, and blue) of pixels included in a block of a specific size centered on an edge region in the image, and then calculate the color distribution of a region which is smaller than the average value, and the color distribution of a region larger than the average value, respectively. Thereafter, the processor 120 may calculate the value for each pixel by combining the degree of the high frequency around the edge region and the degree of the color distribution, and then identify a region including the pixel having the high value as an object region.

The processor 120 may identify an object included in an image and determine a region including the object as an object region, using an artificial intelligence (AI) model which is learned to identify an object included in an image by analyzing an image.

For this purpose, the memory 110 may be stored with the AI model that is learned to analyze the image and identify one or more objects included in the image. At this time, the AI model may be stored in the memory 110 after being learned through an external device (not shown), or the like, or may be learned by the processor 120 which includes a dedicated AI chip such as a deep neural network (DNN) for machine learning.

Alternatively, the processor 120 may receive a determination result of the AI model stored in an external device (not shown) in a data form, and identify an object included in the image based thereon, by communicating with an external device (not shown).

The object may be an animal, sky, ground, sea, sun, star, moon, a human, various food, the human face, other things, or may be an object corresponding to a natural element such as a flower, a grass, a tree, or the like. The object identified by the processor 120 becomes different according to data used for learning of the AI model identified by the processor 120, and thus, the object is not limited to the examples described above.

Figure 3:
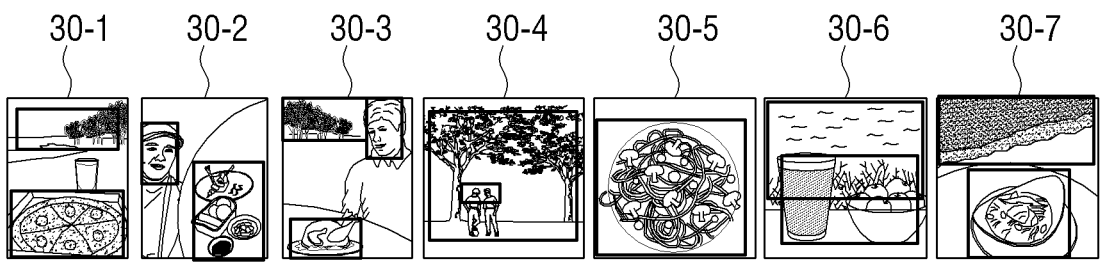
FIG. 3 shows an example of identifying a level of importance of each of an object region, while obtaining an object region from a plurality of images.

FIG. 3 shows an example of identifying an object region by the processor 120, from among a plurality of images.

Referring to FIG. 3, the processor 120 may identify an object region corresponding to the natural scenery and pizza from a first image 30-1, and identify an object region corresponding to the face and food from a second image 30-2. As such, a total of 14 various object regions are identified from seven images 30-1, 30-2, ..., 30-7.

The processor 120 may identify a category corresponding to each of the identified object regions, on the basis of prestored information on a category. In this case, the category corresponding to the pre-stored information may be variously predetermined, such as face, food, nature, animal, plant, or the like.

The processor 120 may determine the level of importance of each object region based on a category of an object included in each object region. For example, an object region including an object such as pizza, hamburger, or the like, may be identified as corresponding to a "food" category.

The processor 120 may identify a priority to be higher than another category for a predetermined category. Specifically, for an object region corresponding to a predetermined category, the level of importance of an object region corresponding to another category may be identified higher. The processor 120, in determining the editing and arranging of a plurality of images for inserting a plurality of images into a plurality of regions divided according to a layout, determines the editing and arranging so as to minimize the degree of loss of an object region included in a plurality of images. At this time, even if the same region is lost for each object region, it may be determined that the degree of loss of an object region having a higher level of importance is greater.

The processor 120 may determine (or identify) the level of importance of each of the object regions based on the number of object regions corresponding to each categories, among the object regions included in the plurality of images.

Specifically, the processor 120 may obtain a ratio of an object region corresponding to each categories among object regions included in a plurality of images, and determine the level of importance of the object region corresponding to a category having the highest obtained ratio among the categories, from among the object regions included in the plurality of images, to be highest.

The object regions identified in FIG. 3 correspond to one category among food, nature, and face, respectively. At this time, the processor 120 may identify that, from among 14 object regions included in the seven images 30-1, 30-2, ..., 30-7, six corresponds to the "food" category, five corresponds to "nature" category, and three corresponds to "face" category. The processor 120 may identify the importance of the object region corresponding to the "food" category having the highest ratio to be the highest, and identify the importance of the object region corresponding to the "nature" category having the second highest ratio to be the second highest, from among the 14 object regions.

The above-described example in which the processor 120 identifies importance based on the category ratio of the object region is based on a point that the category corresponding to the largest object region among the object regions included in the plurality of images is highly likely to be the category which matches the taste or intention of the user who photographs or obtains a plurality of images.

The processor 120 may identify importance of a category and an object region based on a direct user input. Specifically, for a category selected based on a user input, a higher importance may be identified, as compared to another category.

At this time, the processor 120 may set the ranking of the level of importance for each category stored on the basis of a user input for selecting at least one of a plurality of categories stored in the memory 110. As a result, the processor 120 may identify the level of importance of an object region corresponding to a category with high importance based on a user input, to be higher than the level of importance of the object region corresponding to the category in which the importance is set to be low.

The processor 120 may obtain an object region included in a plurality of images, and then determine the importance of each object region, based on a user input to select at least one of a category of the obtained object regions.

For example, when an object region corresponding to the "food", "nature" and "face" categories is obtained from seven images 30-1, 30-2, ..., 30-7, as illustrated in FIG. 3, if a user input to set the ranking of the level of importance to be the order of "face," "nature," and "food" is received, the processor 120 may identify the importance of the object region corresponding to the category of "face" category to the highest level, and identify the importance of the object region corresponding to "nature" category to the second highest level.

The processor 120 may obtain an object region included in a plurality of images and then determine the importance of each object region based on a user input directly selecting at least one of the obtained object regions.

In the meantime, the processor 120 may determine the level of importance of object regions included in other plurality of images, based on the user input history for selecting at least one of object regions included in a plurality of specific images or at least one of categories of the object region.

Specifically, the processor 120 may store information on the user input for selecting at least one of the categories of the object regions included in a plurality of images in the memory 110, and in determining arrangement of a plurality of other images for a plurality of regions which are divided according to the above-described layout or a predetermined another layout, the processor 120 may determine the level of importance of the object region included in a plurality of other images based on a category of the at least one object region included in the plurality of other images, and stored information on the user input.

For example, when there is history of receiving the user input to select "face" category from among the categories of an object region included in the plurality of images, the processor 120 may store the history in the memory 110, and reflect the history in determining the level of importance of an object region included in a plurality of other images and determine the importance of the object region corresponding to the "face" category, from among the object regions included in the above-described plurality of other images, to be the highest.

In the meantime, if the level of importance is identified through the embodiments described above, the processor 120 may reflect the identified importance to each object region and arrange a plurality of images in a plurality of regions in the layout, so that the degree of loss of the object region to which the importance is reflected may be minimized.

Specifically, the processor 120 may obtain an interest value reflecting the importance identified for each object region per unit region of the object region, and in arranging a plurality of images in a plurality of regions, may determine the arrangement of the plurality of images so that the degree of loss of the obtained interest value may be minimized.

Figure 4:
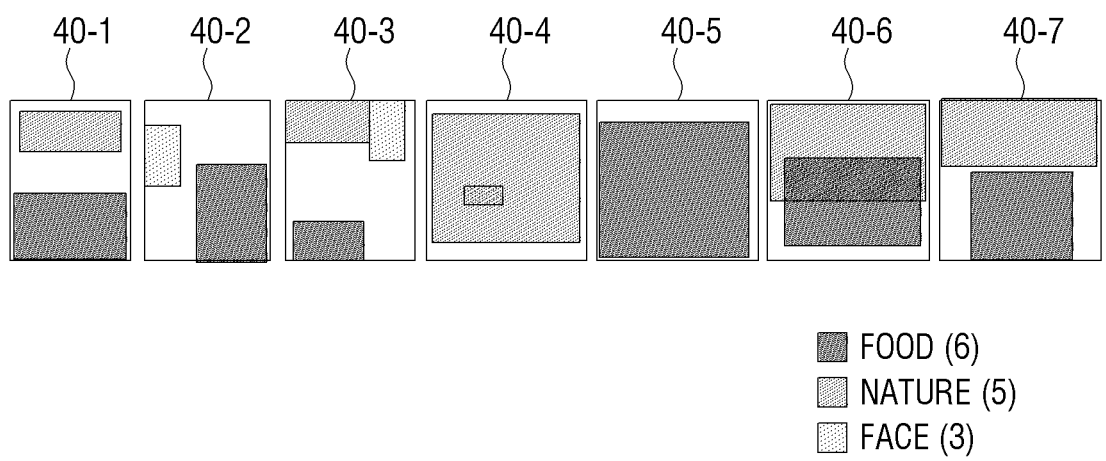
FIG. 4 shows an example of identifying a level of importance of each of an object region, while obtaining an object region from a plurality of images.

FIG. 4 is a view to describe a result of reflecting an interest value to each region based on the result of identifying the level of importance of each object region, by the processor 120. In seven images 40-1 and 40-2, ..., and 40-7, the brightness of each object region is displayed differently according to the importance (interest value). In FIG. 4, the darker the region having a higher interest value, the thicker (darker) it is displayed.

As illustrated in FIG. 4, when the level of importance of a category is identified in the order of an object region corresponding to "food", an object region corresponding to "nature", and an object region corresponding to "face", the processor 120, for example, may assign a value of interest "3" for each unit region of the object region corresponding to "food", a value of interest "2" for each unit region of the object region corresponding to "nature," and a value of interest "1" for each unit region of the object region corresponding to "face."

At this time, if one of the object region corresponding to "food" and the object region corresponding to "nature" has to be lost by a predetermined region when a plurality of images are arranged in a plurality of regions, the processor 120 may determine the arrangement of the plurality of images so that the object region corresponding to "nature" is lost by the corresponding region, in consideration of the interest value.

In the meantime, in the above-described embodiments, it has been described with the premise that the processor 120 obtains the same interest values for each unit region, as for an internal region of each object, but the processor 120 may identify the level of importance of a region which corresponds to the identified object, from among the object regions, to be higher than a region which does not correspond to the identified object. For example, referring to the first image 30-1 of FIG. 3, since the pizza does not fill the object region of the quadrangle in the object region including the pizza, the processor 120 may identify the interest value of a region corresponding to the pizza itself among the object regions to be higher than the value of interest of the remaining region.

In determining the arrangement of a plurality of images for a plurality of regions which are divided according to the layout, in order to determine the arrangement which enables the degree of loss of interest values to be minimized, the processor 120, in arranging each image of a plurality of images in each region among a plurality of regions, may determine an optimal arrangement in which the degree of loss of interest values corresponding to each image is minimized, and identify the degree of loss of interest values. In addition, the processor 120 may determine an optimal arrangement of each of a plurality of images for each of a plurality of regions, that is, an arrangement in which the degree of loss of interest values of the object regions included in a plurality of images is minimized, in consideration of both the determined optimal arrangements and the degree of loss of interest values.

To be specific, in arranging a first image, from among a plurality of images, in each of a plurality of regions respectively, the processor 120 may identify arrangement of the first image so that the degree of loss of the interest value corresponding to the object region included in the first image is minimized, and identify the degree of loss of the interest value.

At this time, the processor 120 may reduce or enlarge the first image while maintaining an aspect ratio based on the size of each of the plurality of regions. If the aspect ratio of each of the plurality of regions is different from the aspect ratio of the first image, when only a portion corresponding to a size of each of a plurality of regions in a reduced or enlarged first image is arranged in each of a plurality of regions, the arrangement of the first image may be identified so that the degree of loss of the interest value corresponding to the object region included in the first image is minimized. In addition, in this case, the degree of loss of interest values may be identified.

For example, if the aspect ratio of the first image is 2:1, while the aspect ratio of the specific region to which the first image is to be arranged is 1:1, the corresponding region should be full of the first image, and the processor 120 may enlarge or reduce the first image while maintaining the aspect ratio of the first image, so that the vertical size of the first image is equal to or greater than the vertical size of the corresponding region. At this time, if the processor 120 enlarges or reduces the first image so that the vertical size of the first image is equal to the vertical size of the corresponding region, the horizontal size of the first image is doubled the horizontal size of the corresponding region. Therefore, the processor 120 may remove a region corresponding to a half of the size of the horizontal size of the enlarged or reduced first image, so that the degree of loss of the value of interest is minimized, and arrange the first image in the corresponding region.

In the meantime, if the information on the size of the layout has not yet been determined, in other words, if only the aspect ratio of each of the plurality of regions divided according to the layout is determined, the processor 120 may arrange only a portion corresponding to an aspect ratio of each of a plurality of regions of the first image in each of the plurality of regions, when arranging the first image in each of the plurality of regions. In addition, when information on the size of the layout is determined later, the processor 120 may enlarge or reduce a portion corresponding to the aspect ratio of each of the plurality of regions, from among the first image, to correspond to the size of each of the plurality of regions, and arrange in each of a plurality of regions.

For example, when the aspect ratio of the first image is 2:1, and the aspect ratio of the specific region in which the first image is to be arranged is 1:1, if the size of the corresponding region has not yet been determined, in arranging the first image in the corresponding region, the first image has to fill the corresponding region. Therefore, the processor 120 may obtain an image of the portion which corresponds to 1:1 of the aspect ratio, from the first image, and arrange in the corresponding region. At this time, the processor 120 may obtain a partial image including the interest value of the first image as much as possible. In addition, when information on the size of the layout is determined, and the size of the corresponding region is determined, the aspect ratio of the partial image and the corresponding region is already the same as 1:1, and thus, the processor 120 may enlarge or reduce the partial image in accordance with the size of the corresponding region, and arrange the partial image in the corresponding region.

Figure 5:
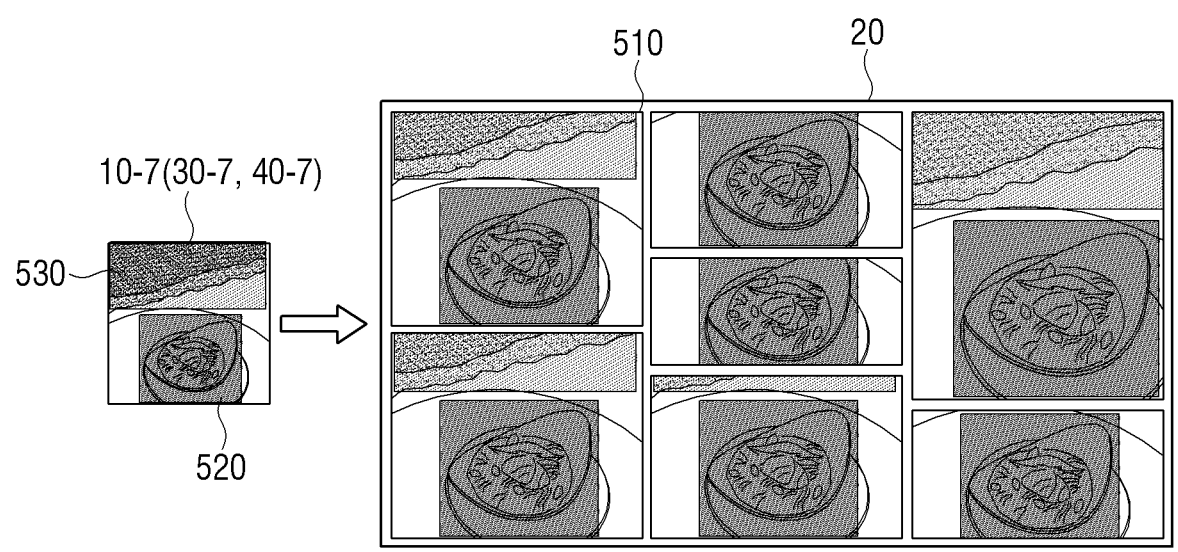
FIG. 5 describes an example of obtaining a minimum loss value of an interest value in arranging each image in each of a plurality of regions.

FIG. 5 illustrates that, in arranging a specific image 10-7, from among seven images 10-1, 10-2, . . . , 10-7, in each of the plurality of regions which are divided according to the layout 20, the image 10-7 is arranged in each of the plurality of regions according to an optimal arrangement that the degree of loss of the interest value corresponding to the object region included in the image 10-7 is minimized.

In FIG. 5, referring to an upper left region 510 among the seven regions divided according to the layout 20, as a result of matching the horizontal size of the upper left region 510 and the image 10-7, the vertical length of the image 10-7 having the aspect ratio different from that of the upper left region 510 becomes larger than the vertical length of the upper left region. Accordingly, a part of at least one of two object regions 520 and 530 included in the image 10-7 has to be cut off. Consequently, in arranging the image 10-7 on the upper left region 510, it may be identified that the loss region of the object region 520 corresponding to the category of "food" having a relatively higher level of importance (the interest value per unit region) is arranged to be smaller than the loss region of the object region 530 corresponding to the category of "nature".

In the meantime, in determining the arrangement to minimize the degree of loss of the interest value, when the enlarged or reduced image is arranged on a specific region, the processor 120 may use an integral image to which the interest value is reflected as numbers.

Figure 6A:
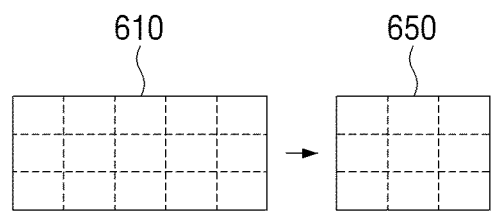
FIGS. 6A and 6B describe an example of obtaining a minimum loss value of an interest value in arranging each image in each of a plurality of regions.
Figure 6B:
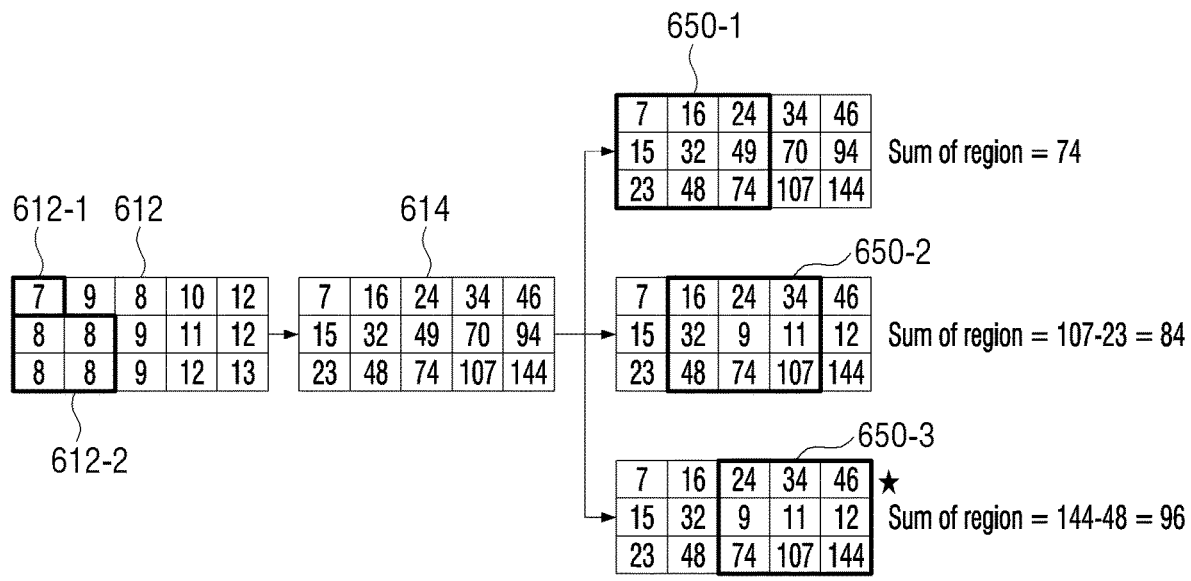

FIGS. 6A to 6B are views of an example of using an integral image to which an interest value of a specific image is reflected, in determining arrangement of the specific image for a specific region by the processor 120.

Referring to FIG. 6A, in inserting a specific image 610 into a specific region 650, the horizontal size of the image 610 is larger than the horizontal size of the corresponding region 650, and thus, in order to arrange the image 610 in the corresponding region 650, a part of the image 610 needs to be removed.

FIG. 6A assumes a situation that, when the processor 120 arranges the image 610 in the corresponding region 650, the processor 120 needs to determine an arrangement so that the degree of loss of the interest value of the object region included in the image 610 becomes minimum.

Referring to FIG. 6B, the processor 120 may obtain an image 612 in which the interest value is reflected and digitized for each unit region of the image. For example, an upper left region 612-1 of the digitized image 612 does not include an object region and thus has a relatively small value of interest "7"", whereas, in a comparatively wide region 612-2 at a lower left, an object region having the level of importance is located and the value of interest is "8".

Referring to FIG. 6B, the processor 120 may obtain an integral image 614 from the digitized image 612. The processor 120 may acquire the integral image 614 by setting a value obtained by adding all the values of the coordinates, the left region of the coordinates, the upper region of the coordinates, and the upper left region of the coordinates based on the specific coordinates of the digitized image 612, as a numerical value of the corresponding coordinate, with respect to a specific coordinate of the digitized image 612. For example, "48" (48=7+9+8+8+8+8) located at (3 (row), 2 (column)) on the integral image 614 indicates that the numbers in the left side, upper side, and the upper left side are summed up, including "8" located at (3, 2) on the digitized image 612.

Referring to FIG. 6B, a case where the image 610 is arranged in a corresponding region 650 includes a case where the left region of the image 610 is arranged 650-1, a case where the center region of the image 610 is arranged 650-2, and a case where a right region of the image 610 is arranged 650-3. The processor 120 may determine an arrangement in which the degree of loss of interest is minimum, that is, the degree of loss of the numerical value on the digitized image 612 becomes minimum, from among the above three arrangements, as the optimal arrangement.

Referring to FIG. 6B, the processor 120 may determine that a third arrangement 650-3 in which the sum of the numerical values corresponding to the portions arranged in the corresponding region 650 is the largest as "96" as the optimal arrangement in which the degree of loss of the interest value becomes minimum.

In arranging the first image, from among a plurality of images in each of the plurality of regions, the processor 120 may identify the arrangement of the first images such that the degree of loss of the value of interest is minimized, and identify the degree of loss of the interest value corresponding to the object region included in the first image.

Figure 7:
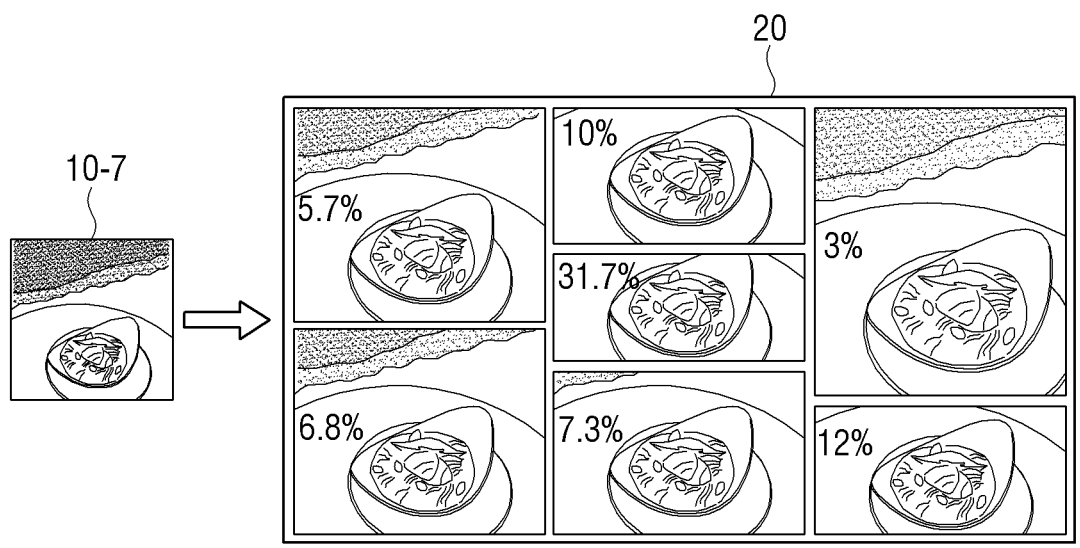
FIG. 7 describes an example of obtaining a minimum loss value of an interest value in arranging each image in each of a plurality of regions.

FIG. 7 illustrates the optimal arrangement, in arranging the specific image 10-7 among the seven images 10-1, 10-2, ..., 10-7, in each region in the layout 20, that the degree of loss of the interest value corresponding to the image 10-7 is minimized. Also, referring to FIG. 7, in each region in the layout 20, the degree of loss of interest values according to the optimal arrangement of the image 10-7 for each region is represented as a ratio.

The processor 120 may determine the arrangement of the plurality of images based on the optimal arrangement of the first image for each region and the degree of loss of interest value at that time. Specifically, in arranging a plurality of images in a plurality of regions, the processor 120 may determine the arrangement of a plurality of images such that a degree of loss of the interest value corresponding to the object region included in the plurality of images is minimized.

For each of the other images as well as the first image, from among a plurality of images, the processor 120 may identify the optimal arrangement for each of the plurality of regions and the degree of loss of the interest value according to the optimal arrangement.

Specifically, in the case where the second image, which is not the first image among the plurality of images is arranged in each of the plurality of regions, the processor 120 may identify the (optimal) arrangement of the second image such that the degree of loss of the interest value according to the object region included in the second image is minimized, and identify the degree of loss of the interest value, at this time. In addition, the processor 120 may determine the arrangement of the plurality of images based on the optimal arrangement of the identified second image and the degree of loss of the interest value at that time.

In other words, when the plurality of images are arranged in a plurality of regions, arrangement of a plurality of images so that the degree of loss of the interest value corresponding to the object region included in the plurality of images is minimized may be determined, based on all of the optimal arrangement of the first image which is identified before, the degree of loss of interest value according thereto, the optimal arrangement of the identified second image, and the degree of loss of the interest value.

When the number of a plurality of images is three or more, and one or more other images other than the first and second images are included, the processor 120 may identify the optimal arrangement for each of the plurality of regions and the degree of loss of the interest value for other images as well.

As described above, as a result of the optimal arrangement of each of the plurality of images for each of the plurality of regions and the degree of loss of the interest value corresponding thereto being respectively identified, the processor 120 may determine the optimal arrangement, that is, the arrangement in which the degree of loss of the interest value corresponding to the plurality of images is minimized, using the identified result.

FIG. 8 is a table describing a minimum loss value of an interest value, in arranging each image in each of a plurality of regions, to describe a case in which loss of an interest value is minimized, in arranging a plurality of images in a plurality of regions.

In FIG. 8, rows correspond to each of a plurality of images 10-1, 10-2, ..., 10-7, and inner columns correspond to each of the plurality of regions (see FIG. 1).

Referring to FIG. 8, in the case of the first image 10-1, loss of the interest value may be minimized (4.7), if the first image 10-1 is arranged in the sixth region among the plurality of regions, and in the case of the second image, if the second image is arranged in the sixth region, the loss of the interest value may be minimized (1.5). However, there is a problem in that both the first image and the second image may not be arranged in the sixth region.

Therefore, the processor 120 may use the Hungarian method which is the N*M optimization matching algorithm, so that the loss of the interest value corresponding to all the plurality of images is minimized.

As a result, referring to FIG. 8, the processor 120 may determine that the loss of the interest value of the object region included in the plurality of images 10-1, 10-2, ..., 10-7 may be minimized, when the first image 10-1 is arranged in the first region, the second image 10-2 is arranged in the sixth region, the third image 10-3 is arranged in the seventh region, the fourth image 10-4 is arranged in the third region, the fifth image 10-5 is arranged in the fourth region, the sixth image 10-6 is arranged in the second region, and the seventh image 10-7 is arranged in the fifth region (At this time, it is natural that, in arranging each image in each region, the arrangement follows the optimal arrangement of each image for each of the identified region).

In conclusion, the processor 120 may finally determine the arrangement of a plurality of images for a plurality of regions divided according to the layout. Then, the processor 120 may store the information on the determined arrangement in the memory 110. Thereafter, the processor 120 may control the electronic apparatus 100 so as to display a plurality of images on a plurality of regions based on information on the determined arrangement stored in the memory 110. At this time, the processor 120 may control a display (not shown) included in the electronic apparatus 100 to display a plurality of images. Alternatively, so that an external display device (not shown) may display a plurality of images, data on the plurality of images and/or data for the determined arrangement may be transmitted wirelessly or by wire to the external display device (not shown) through a communicator (not shown) or an input/output port (not shown) of the electronic apparatus 100.

Figure 9:
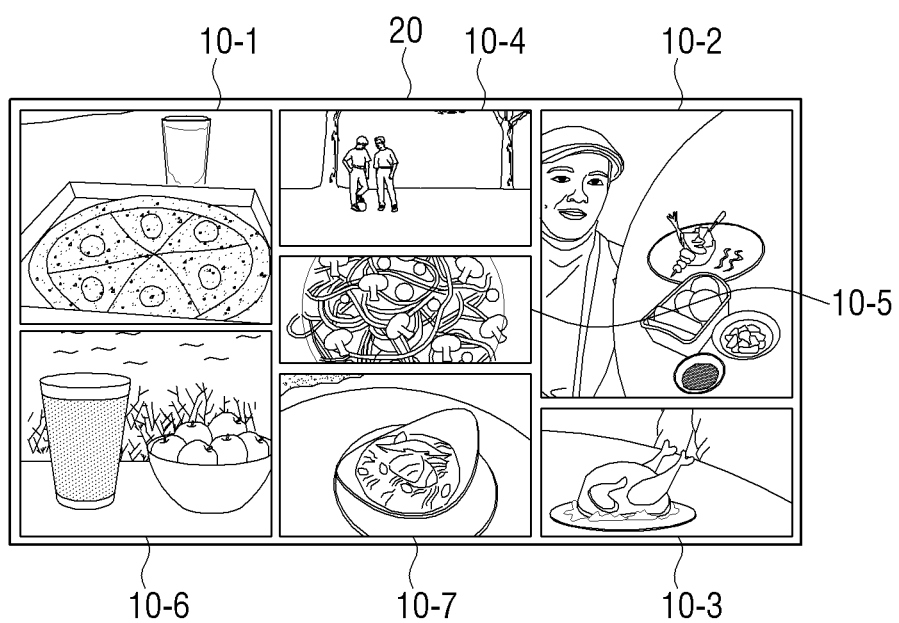
FIG. 9 illustrates a result of arranging a plurality of images in a plurality of regions so that loss of an interest value is minimized.

FIG. 9 illustrates an example that, when the seven of images 10-1, 10-2, ..., 10-7 are arranged in a plurality of regions which are divided according to the layout 20, the arrangement in which the degree of loss of the interest value is minimized is finally determined, and the seven images 10-1, 10-2, ..., 10-7 are displayed accordingly.

In the meantime, the above-described embodiments mainly describe a case where a plurality of images are arranged in a plurality of regions. However, in arranging one image in one region by the processor 120, the interest value of each object region may be obtained based on importance of each of at least one object region included in the corresponding image, and the arrangement of the corresponding image in which the degree of loss of interest value is minimized may be determined.

FIG. 10 and FIGS. 11A to 11C are a block diagram and views to describe a configuration of the electronic apparatus 100, according to various embodiments.

Figure 10:
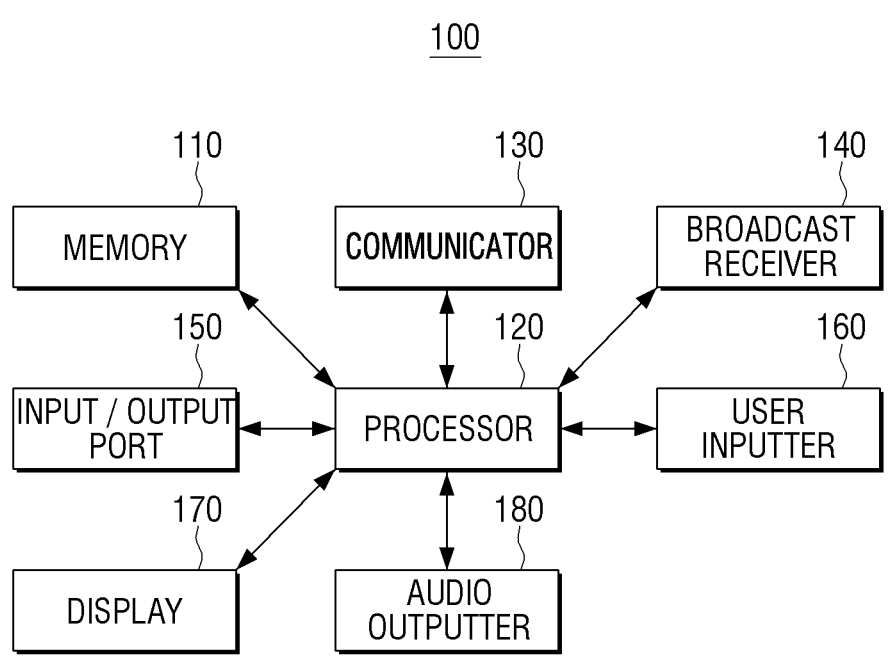
FIG. 10 is a block diagram to describe a configuration of an electronic apparatus, according to various embodiments.

Referring to FIG. 10, the electronic apparatus 100 may further include at least one of a communicator 130, a broadcast receiver 140, an input/output port 150, a user inputter 160, a display 170, and an audio outputter 180, in addition to the memory 110 and the processor 120.

The communicator 130 is for performing data communication by wire or wirelessly with an external device (not shown). The processor 120 may communicate with various external devices using the communicator 130.

When performing data communication with an external device using a wireless communication method, the communicator 130 may include at least one of a WIFI DIRECT communication module, a Bluetooth module, an infrared data association (IrDA) module, a near field communication (NFC) module, the Zigbee module, the cellular communication module, the third generation (3G) mobile communication module, the fourth generation (4G) mobile communication module, the 4G long term evolution (LTE) communication module.

When performing data communication with an external device using a wired communication method, the communicator 130 may be connected to a coaxial cable, an optical fiber cable, and the like, to perform a Local Region Network (LAN) communication to transmit/receive various data.

The processor 120 may receive information on one or more images and/or layouts from outside through the communicator 130.

Figure 11A:
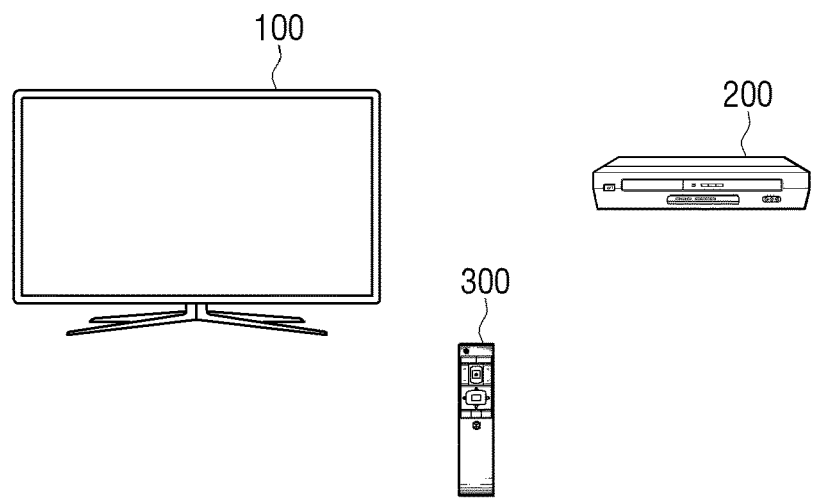
FIGS. 11A, 11B and 11C are views to describe a configuration of an electronic apparatus, according to various embodiments.
Figure 11B:
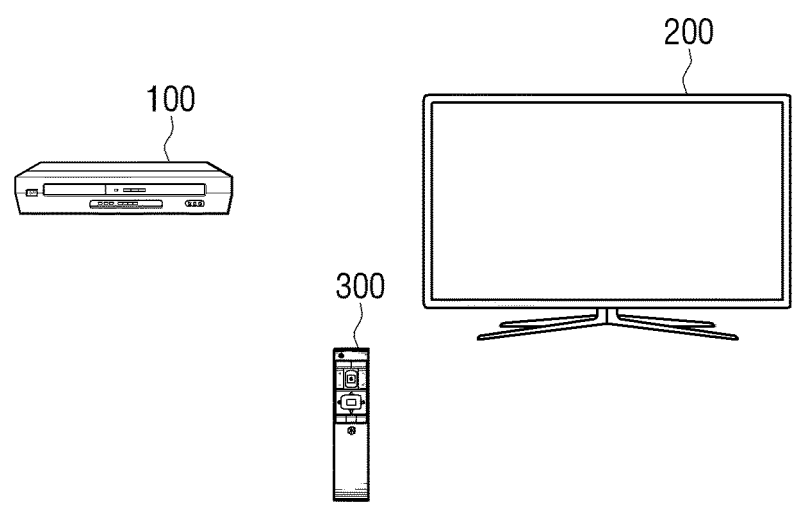
Figure 11C:
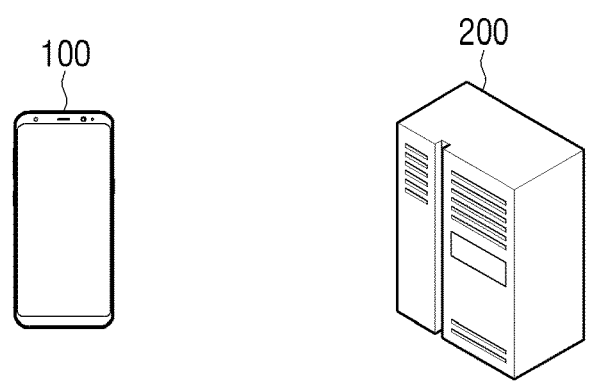

For example, when the electronic apparatus 100 is implemented as a mobile phone or a smart phone as FIG. 11C, and communication with an external device 200, which is a server, through the communicator 130 is available, the electronic apparatus 100 may receive data for one or more images and/or layouts from an external device 200, which is a server, and may determine the arrangement of images for one or more regions distinguished according to the layout.

The communicator 130 may separately include a first communicator (not shown) for transceiving data with a remote control device (not shown) for controlling the electronic apparatus 100, and a second communicator (not shown) for transceiving data with an external server (not shown). At this time, the first communicator (not shown) may be implemented as an Ethernet modem, a Wi-Fi module, a Bluetooth module, or the like, while the second communicator may be implemented as a separate Wi-Fi module, an Ethernet module, or the like.

The broadcast receiver 140 may receive a signal on the broadcast contents. The broadcast contents may include an image, an audio, and additional data (for example, electronic program guides (EPG)), and the broadcast receiver 140 may receive a broadcast contents signal from various sources such as terrestrial broadcasting, cable broadcasting, satellite broadcasting, Internet broadcasting, or the like.

The broadcast receiver 140 may be implemented to include configurations such as tuner (not shown), a demodulator (not shown), and an equalizer (not shown) for receiving broadcast contents transmitted from a broadcasting company.

Through the input/output port 150, the electronic apparatus 100 may receive a signal for an image and/or voice from the outside or transmit an image and/or audio signal to the outside.

For this purpose, the input/output port 150 may be implemented as a wired port such as a high-definition multimedia interface (HDMI) port, a display port, a red, green, blue (RGB) port, a digital visual interface (DVI) port, Thunderbolt port, component port, and the like. Alternatively, the input/output port 150 may be implemented as a port for wireless communication such as Wi-Fi and Bluetooth communication, or the like.

The input/output port 150 may be implemented as the HDMI port or the Thunderbolt port to transmit the image and audio signals as well, but the first port which transmits an image signal and the second port which transmits an audio signal may be separately implemented.

The input/output port 150 may include an interface module such as USB, and transceive audio or image data, or transceiver firmware data to perform firmware upgrade through physical connection with an external terminal device such as PC through the interface model.

For example, as shown in FIG. 11A, when the electronic apparatus 100 is a display device such as a TV including a display, the electronic apparatus 100 may receive one or more images from the external device 200 such as a set-top box. In addition, the processor 120 may determine an arrangement for inserting one or more inputted images into a plurality of regions divided according to a predetermined layout.

As another example, when the electronic apparatus 100 is implemented as a set-top box or the like as shown in FIG. 11B, the electronic apparatus 100 may determine the arrangement of a plurality of images for a plurality of regions divided according to the layout and then transmit data for a plurality of images arranged in a plurality of regions to the external device 200 having a display such as a TV through the input/output port 150 according to the determined layout. As a result, the external device 200 may display a plurality of images arranged in a plurality of regions in accordance with the arrangement determined by the electronic apparatus 100.

The user inputter 160 is a configuration to enable the electronic apparatus 100 to receive the user input including a command or information from a user.

The processor 120 may receive, through the user inputter 160, a user input for selecting at least one of a category corresponding to at least one object region or at least one of an object region included in one or more images.

The user inputter 160 may include at least one button (not shown), keyboard (not shown), mouse (not shown) for receiving a user input for selecting at least one object region or category.

In order to receive a user input for selecting at least one object region or category as a touch format, the user inputter 160 may include a touch panel (not shown) which is implemented along with the display 170 or a separate touch pad (not shown).

The user inputter 160 may obtain at least one image, based on a user manipulation for a button, a keyboard, a mouse provided in the user inputter 160 and/or a user input for a touch panel/pad provided in the user inputter 160. That is, the user may draw one or more images through the user inputter 160.

The user inputter 160 may include one or more cameras (not shown), and obtain an image photographed through a camera (not shown). At this time, one or more cameras (not shown) may be a digital camera including an optical sensor.

The user inputter 160 may include a microphone (not shown) to receive a user input to select at least one object region or category as a voice.

Meanwhile, as shown in FIG. 11A or FIG. 11B, if there is a remote controller 300 for controlling the electronic apparatus 100, the electronic apparatus 100 may receive data on the user voice received through the microphone (not shown) provided in the remote controller 300 from the remote controller, and may receive a user input to select at least one object region or category based thereon. At this time, when the analog audio signal is received through the microphone (not shown) provided in the remote controller 300, the remote controller 300 may digitalize and transmit the signal to the electronic apparatus 100 through the Bluetooth or Wi-Fi communication.

Specifically, the processor 120 may recognize the data on the user voice received through a microphone (not shown) provided in the user inputter 160 or a microphone (not shown) provided in the remote controller 300 through voice and convert the data to a text, and identify a content of a user input to select at least one object region or category based on the content of the converted text.

In the meantime, the remote controller 300 described above may be implemented as a remote controller for controlling the electronic apparatus 100 which is a TV or a set-top box as in FIG. 11A or FIG. 11B, or may be implemented to control the electronic apparatus 100 which is a TV or a set-top box, as a remote control application is installed and stored in a terminal device such as a smartphone. At this time, the remote controller 300 may transmit a control signal to the electronic apparatus 100 based on Wi-Fi, Bluetooth, infrared communication, or the like, and the electronic apparatus 100 may include a first communication unit (not shown) which is implemented as a Wi-Fi module, Bluetooth module, infrared communication module or the like, capable of receiving a control signal of the remote controller 300 according to the aforementioned communication method, or a second communication unit which is implemented as the Wi-Fi module, Ethernet module, or the like, capable of communicating with an external device (not shown) such as a server. The first communication unit and the second communication unit may be implemented as one or implemented separately.

The display 170 is a configuration to display one or more images according to the control of the processor 120. For this purpose, the display 170 may be implemented as a liquid crystal display (LCD), a plasma display panel (PDP), an organic light emitting diode (OLED), transparent OLED (TOLED), or the like. In the case of the LCD, the display 170 may include a driving circuit (not shown) and a backlight unit (not shown), which may be implemented in the form of an a-si TFT, a low temperature poly silicon (LTPS) TFT, an organic TFT (OTFT), or the like.

Meanwhile, the display 170 may be implemented as a touch screen including a touch panel capable of sensing a touch manipulation of a user. In this case, the display 170 may be included in the user inputter 160.

The display 170 may display an image included in a broadcasting signal received through the broadcast receiver 140, an image included in data received through the communicator 130, an image obtained through the user inputter 160, an image included in an image file stored in the memory 110, an image included in a signal received from the outside through the input/output port 150, or the like.

The audio outputter 180 is a configuration for outputting a specific audio under the control of the processor 120. The audio outputter 180 may output audio included in the broadcast signal received through the broadcast receiver 140, audio included in a signal received through the communicator 130, a microphone (not shown) provided in the user inputter 160, audio which is inputted through an external microphone (not shown) and received by the electronic apparatus 100, audio included in an audio file stored in the memory 110, audio included in a signal received from the outside through the input/output port 150, or the like.

For this purpose, the audio outputter 180 may be implemented as a speaker 190 and/or a headphone/earphone output terminal (not shown).

Through FIGS. 12 to 15, a controlling method of the electronic apparatus will be described.

Figure 12:
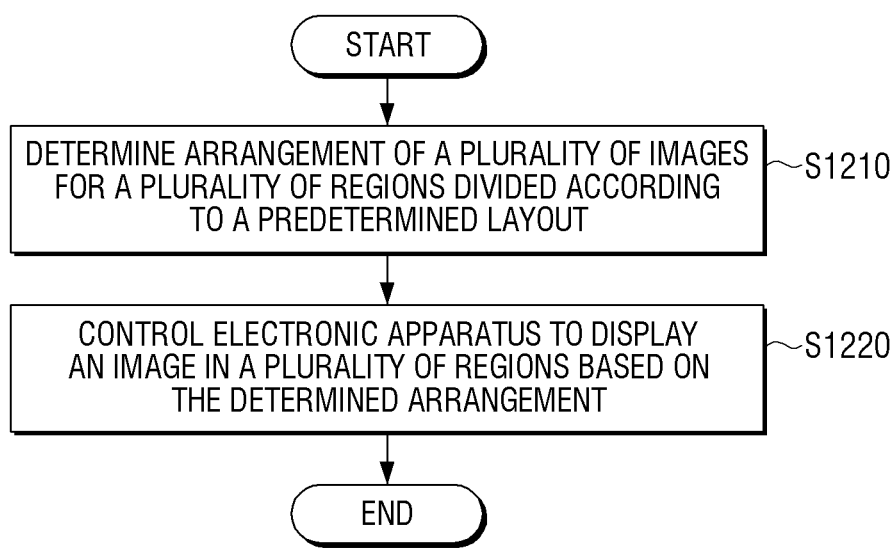
FIG. 12 is a flowchart of a controlling method of another electronic apparatus, according to an embodiment.

FIG. 12 is a flowchart of a controlling method for another electronic apparatus according to an embodiment. Referring to FIG. 12, the controlling method may determine (or identify) the arrangement of a plurality of images for a plurality of regions divided according to a predetermined layout in step S1210, and based on the determined arrangement, control the electronic apparatus to display a plurality of images in a plurality of regions in step S1220. At this time, the plurality of images arranged according to the determined arrangement may be displayed on a display of the electronic apparatus, or displayed on a display of an external device which receives data for a plurality of images from an electronic apparatus.

Figure 13:
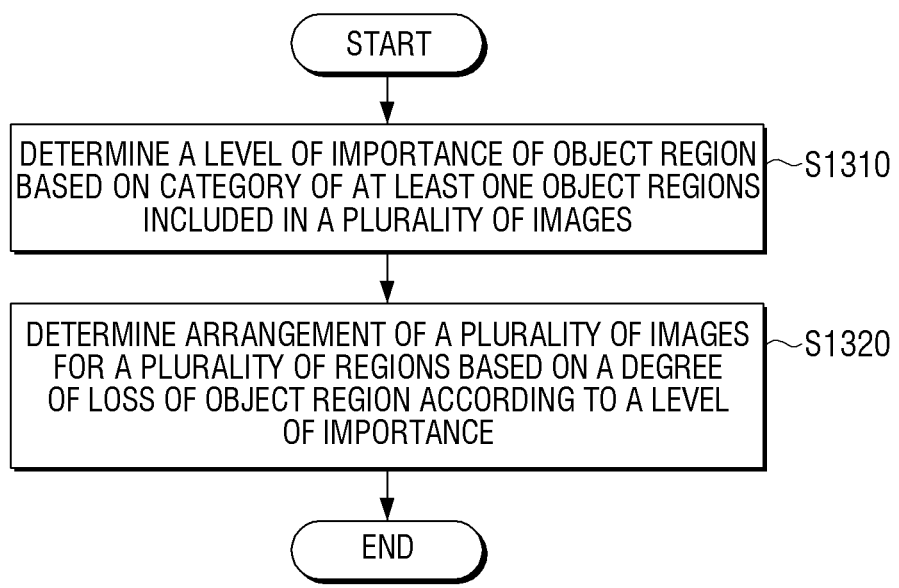
FIG. 13 is a flowchart of an example of determining arrangement of a plurality of images of FIG. 12.

In determining the arrangement of the plurality of images in step S1210, the controlling method may determine the arrangement of a plurality of images based on the importance of at least one object region corresponding to a category of the at least one object region included in the plurality of images, and the degree of loss of the at least one object region according to the importance. FIG. 13 is a flowchart for describing this operation according to a more specific operation order.

Referring to FIG. 13, the controlling method may determine the importance of the object region based on the category of the at least one object region included in the plurality of images, in determining the arrangement of the plurality of images in step S1310.

The object region may be a region including an object having a high importance in an image or a region in which a predetermined object is included. The object region needs not be one for each image, but may not exist for a specific image or may be two or more.

The category may be variously pre-stored such as food, nature, animal, plant, building, face, or the like. For example, if an object included in a specific object region is a hamburger, the object region may be identified to correspond to a food category.

Thereafter, a ranking of importance in each of an object region may be determined according to the identified category.

At this time, among the object regions included in the plurality of images, importance of each object region may be determined based on the number of object regions corresponding to each categories. Specifically, a ratio of an object region corresponding to each categories among object regions included in a plurality of images may be obtained, among the object regions included in the images, and the importance of the object region corresponding to a category having the highest ratio may be determined to be highest.

In the meantime, importance of the object region may be determined on the basis of a user input selecting at least one of categories of object regions included in a plurality of images. In addition, information on a user input selecting at least one of categories of object regions included in the plurality of images may be stored.

Thereafter, in determining the arrangement of the plurality of different images with respect to the plurality of regions divided according to the predetermined layout, the level of importance of the object region included in the plurality of other images may be determined based on the category of at least one object region included in the other plurality of images, and the stored information on the user input.

When the level of importance is determined, in arranging a plurality of images in a plurality of regions, the arrangement of the plurality of images for a plurality of regions may be determined according to the degree of loss of the at least one object region according to the level of importance in step S1320.

At this time, an interest value reflecting the importance identified for each unit region of the object region may be obtained. In arranging a plurality of images in a plurality of regions, the arrangement of the plurality images which enables the degree of loss of the obtained interest value to be minimized may be determined.

Specifically, in arranging the first image, from among a plurality of images, in each of the plurality of regions, when the first image is arranged such that the degree of loss of the interest value corresponding to the object region included in the first image is minimized, the degree of loss of the interest value may be identified.

At this time, the first image may be reduced or enlarged while maintaining an aspect ratio based on the size of each of the plurality of regions. In this case, if the aspect ratio of each of the plurality of regions is different from the aspect ratio of the first image, only a portion corresponding to a size of each of a plurality of regions in a reduced or enlarged first image is disposed in each of a plurality of regions, the arrangement of the first image so that the degree of loss of the interest value corresponding to the object region included in the first image is minimized may be identified. In addition, the degree of loss of interest value according to the (optimal) arrangement of the first image which enables the degree of loss of the interest value to be minimized may be identified.

The arrangement of a plurality of images may be determined on the basis of the arrangement of the identified first images and the degree of loss of interest values according thereto. Specifically, in arranging a plurality of images in a plurality of regions, the arrangement of the images such that the degree of loss of interest values corresponding to the object regions included in the images is minimized may be determined.

While identifying the (optimal) arrangement of the first image for each of the plurality of regions, the optimal arrangement of a second image which is different from the first image, from among a plurality of images, and the degree of loss in the interest value may be identified as well.

Specifically, in arranging the second image of a plurality of images in each of a plurality of regions, (optimal) arrangement of a second image so that the degree of loss of the interest value according to the object region included in the second image is minimized may be identified. At this time, the degree of loss of interest values according to the arrangement of the second images may be identified as well.

Based on the (optimal) arrangement of the second image for each of the plurality of regions and the degree of loss of the interest value according thereto, arrangement of the plurality of images may be determined.

That is, in arranging a plurality of images in a plurality of regions based on the (optimal) arrangement of the first image and the loss of interest value for each of the plurality of regions, the (optimal) arrangement of the second image and the loss of interest value for each of the plurality of regions, or the like, it is possible to determine the arrangement of the plurality of images so that the degree of loss of the interest value corresponding to the object region included in the plurality of images is minimized may be determined.

If the number of the plurality of images is greater than or equal to three, and other images are included in addition to the first and second images, an optimal arrangement for each of a plurality of regions and a degree of loss of interest value may be identified for other images as well. Based on the identification result, the arrangement of a plurality of images for the plurality of regions, which enables the degree of loss of the interest value corresponding to the object region included in the plurality of images to be minimized may be identified.

Figure 14:
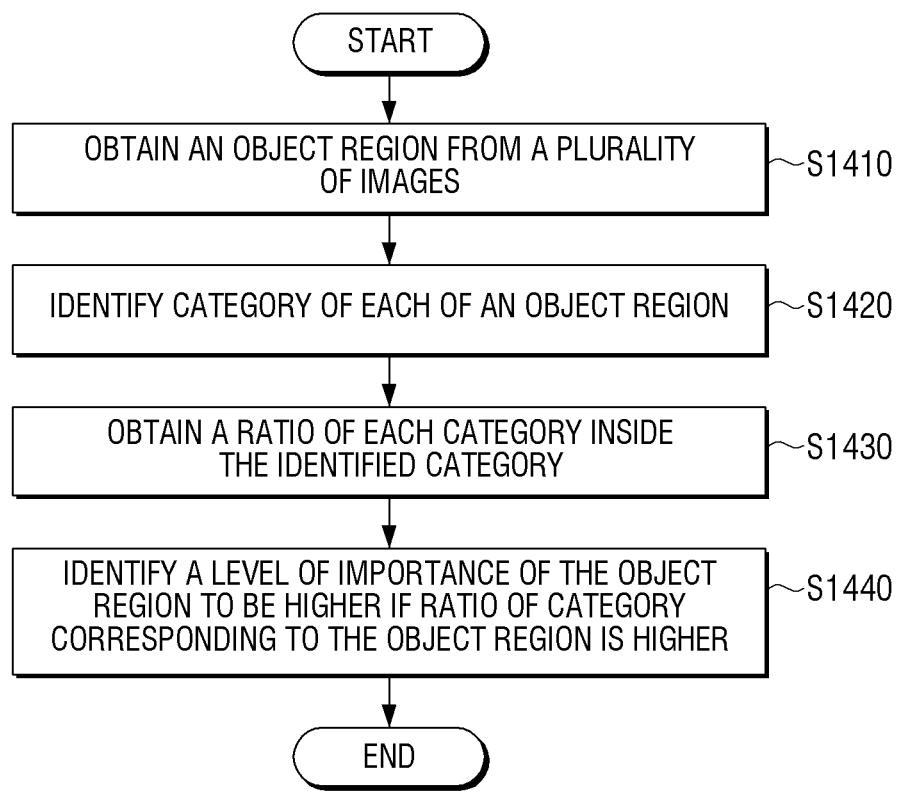
FIG. 14 is a flowchart of an example of identifying a level of importance of an object region.

FIG. 14 is a flowchart of an example of identifying a level of importance of an object region in step S1310 of FIG. 13.

Referring to FIG. 14, first, an object region may be obtained from a plurality of images in step S1410. At this time, an object region may be obtained on the basis of color information and edge information of each of the plurality of images. Alternatively, an object included in an image may be identified by using the AI model which is learned to identify an object included in the image, and a region including the object may be identified as an object region.

While identifying a category of the object included in each of the object region in step S1420, the ratio of each category in the identified category may be obtained in step S1430.

For example, if five object regions among the eight object regions included in five images correspond to "nature" category, and three object regions correspond to "food" category, a ratio of "nature" category is 5/8 and a ratio of "food" category may be identified as 3/8.

In addition, the greater the ratio of the category corresponding to the object region is, the higher the importance of the object region is in step S1440. For example, the ratio of the "nature" category, from among the categories of the object regions is 5/8 and the ratio of the "food" category is 3/8, the importance of an object region corresponding to the "nature" category" may be identified to be higher than the importance of an object region corresponding to the "food" category.

Figure 15:
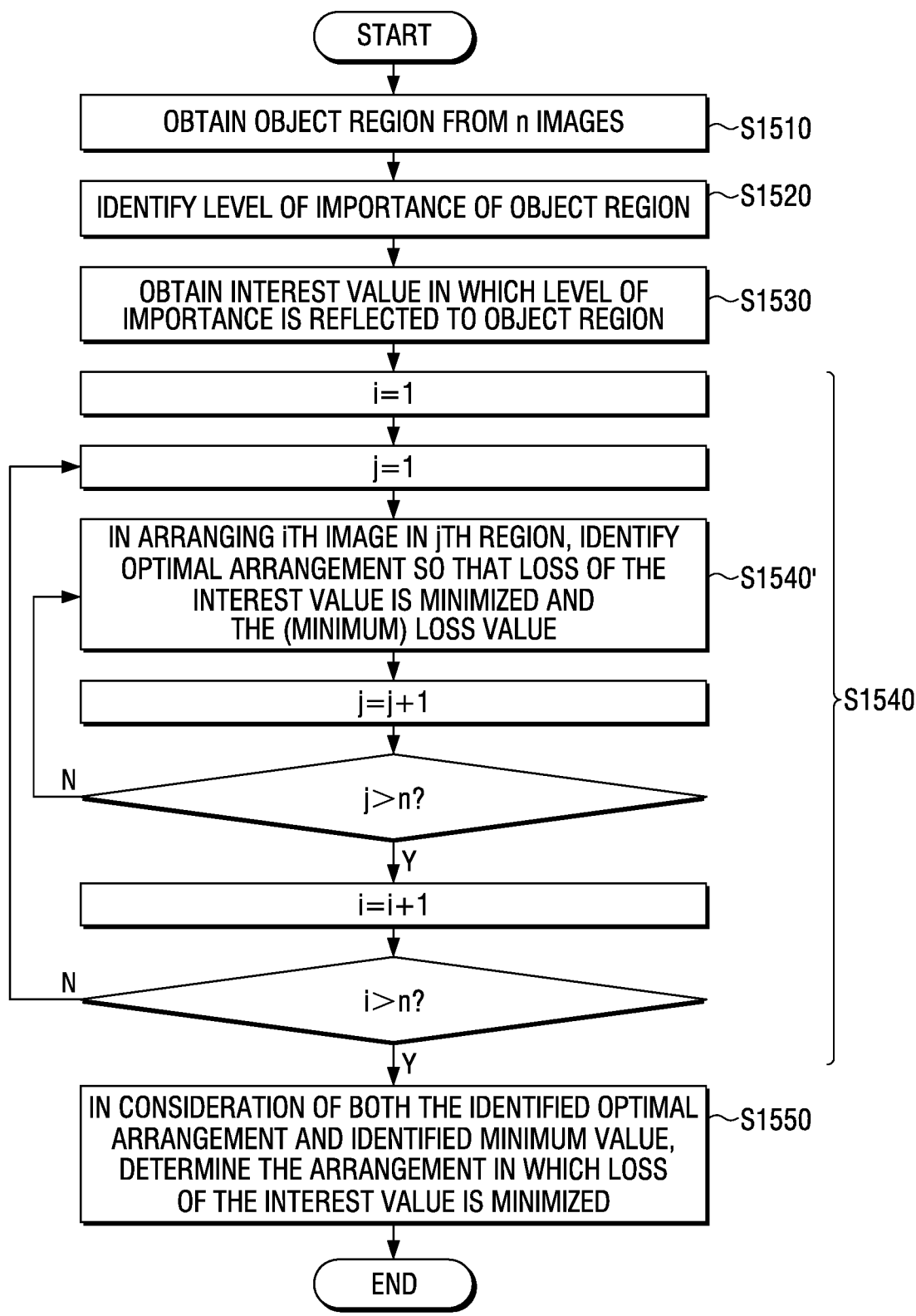
FIG. 15 is an algorithm to describe an example of obtaining an interest value in which a level of importance is reflected to an object region, and determining arrangement so that loss of an interest value is minimized, in arranging a plurality of images in a plurality of regions.

FIG. 15 is a specific embodiment of the step S1320 of FIG. 13, describing an algorithm to describe an example of obtaining the interest value to which the importance is reflected to the object region, and determining the arrangement to enable the loss of the interest value to be minimized in arranging a plurality of images in a plurality of regions.

Referring to FIG. 15, as shown in FIG. 14, an object region is obtained from a plurality (n) of images in step S1510, and the importance of each of the identified object regions may be identified in step S1520. Here, importance of each object region may be identified based on a category of each object region and/or a user input.

The interest value reflecting the importance of the object region may be obtained in step S1530. Specifically, the digitized interest value which reflects the corresponding importance to each unit region of the object region may be obtained.

In arranging each of a plurality of images in each of the plurality (n) of regions, the optimal arrangement which enables the degree of loss of the interest value of the object region included in each image to be minimized may be identified, and the (minimum) loss value of the interest value according to the optimal arrangement may be identified in step S1540.

In this case, for example, in arranging a specific image ($i^{th}$ image from among a plurality of images) in a specific region ($j^{th}$ among a plurality of regions), the optimal arraignment of the image ($i^{th}$) which enables the degree of loss of the interest value corresponding to the object region included in the image ($i^{th}$) to be minimized may be identified, and the (minimum) loss value of the interest value according to the optimal arrangement may be identified in step S1540'. This step may be repeated for all the cases of arranging each of the $1^{st}$ to $n^{th}$ image to each of the first to $n^{th}$ region.

At this time, in consideration of the identified optimal arrangement and the identified (minimum) loss value, the arrangement of the plurality of images for a plurality of regions in which the degree of loss of the interest value corresponding to the entire object region included in the plurality of images is minimized may be finally determined in step S1550. At this time, the Hungarian method, which is the N*N optimization matching algorithm, may be used so that the loss of the interest value corresponding to the entire object region included in the plurality of images is minimized.

As described above, the electronic apparatus 100 and the controlling method thereof, in arranging a plurality of images in a plurality of regions divided according to a layout, an object region included in a plurality of images may be obtained, and the level of importance of each of the object regions is identified and automatically reflected on the basis of the intention of the user and the characteristics of the plurality of images. Thus, there is the effect that the inconvenience of the user who has to separately edit the plurality of images or arbitrarily designate the arrangement thereof may be solved.

The controlling method of the electronic apparatus which is described through FIGS. 12 to 15 may be implemented through the electronic apparatus 100 which is illustrated and described through FIGS. 2 and 10.

Alternatively, the controlling method may be implemented through a system including the electronic apparatus 100 and at least one external device (not shown). In this regard, it may be assumed that the controlling method of the electronic apparatus is performed through the electronic apparatus 100 and a server (not shown). At this time, the electronic apparatus 100 and the server (not shown) may share and perform the steps of the controlling method described with reference to FIGS. 12 to 15 in various forms.

For example, the electronic apparatus 100 may receive one or more images in the form of data or signals through the communicator 130, the broadcast receiver 140, the input/output port 150, or the like, or obtain one or more images photographed by the camera included in the user inputter 160, and transmit the received or obtained image to the server. In arranging one or more images according to the layout prestored in the server, the server may determine arrangement of one or more images so as to minimize the degree of loss according to the level importance of the object region in the at least one image, and transmit the determined information on the arrangement to the electronic apparatus 100. At this time, the electronic apparatus 100 may directly display one or more images arranged according to the determined arrangement, or transmit the information about one or more images arranged according to the determined arrangement to a connected external device (not shown) through the input/output port 150, so that the corresponding external device displays the information.

Alternatively, when the electronic apparatus 100 transmits one or more images to the server, the server may identify the object region from the one or more images and transmit information to the electronic apparatus 100, and the electronic apparatus 100 may identify the level of importance of each object region based on a user input for selecting at least one object among the identified object regions. In arranging one or more images in one or more regions divided according to the layout pre-stored in the memory 110, the electronic apparatus 100 may determine the arrangement to minimize the degree of loss of the object region according to the level of importance.

The various embodiments described above may be implemented in a recordable medium which is readable by computer or a device similar to computer using software, hardware, or the combination of software and hardware.

By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

Meanwhile, the computer instructions for performing the processing operations in the electronic apparatus 100 according to the various embodiments described above may be stored in a non-transitory computer-readable medium. The computer instructions stored in this non-transitory computer-readable medium cause the above-described specific device to perform the processing operations in the electronic apparatus 100 according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided The foregoing embodiments and advantages are merely exemplary and are not to be construed as limiting the disclosure. The present teaching may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. An electronic apparatus comprising:
a memory; and
a processor configured to:
identify an arrangement of a plurality of images for a plurality of regions that are divided according to a predetermined layout,
store information on the identified arrangement in the memory, and
control the electronic apparatus to display the plurality of images in the plurality of regions based on the stored information on the identified arrangement and/or to transmit data for displaying, by an external device, the plurality of images in the plurality of regions based on the stored information on the identified arrangement, wherein
the plurality of images include object regions, and the processor is configured to identify the arrangement of the plurality of images based on a degree of loss of each image in each region, taken together for all the images, wherein the degree of loss of each image in each region is based on interest values of the image that reflect levels of importance of each object region in the image.

2. The electronic apparatus of claim 1, wherein the processor is configured to:
identify the arrangement of the plurality of images so that the degree of loss of each image in each region, taken together for all the images, is minimized.

3. The electronic apparatus of claim 2, wherein
a first image of the plurality of images includes at least one object region, and,
to identify the arrangement of the plurality of images, the processor is configured to:
identify an arrangement of the first image in each region of the plurality of regions so that, in each region, the degree of loss of the at least one object region included in the first image is minimized in accordance with interest values of the first image, and
identify the arrangement of the plurality of images based on the identified arrangement of the first image.

4. The electronic apparatus of claim 3, wherein
a second image of the plurality of images includes at least one object region, and,
to identify the arrangement of the plurality of images, the processor is configured to:
identify an arrangement of the second image in each region of the plurality of regions so that, in each region, the degree of loss of the at least one object region included in the second image is minimized in accordance with interest values of the second image, and
identify the arrangement of the plurality of images based on the identified arrangement of the second image.

5. The electronic apparatus of claim 1, wherein the levels of importance are based on categories of objects included in the object regions, and the processor is configured to identify the levels of importance of the object regions based on a number of object regions corresponding to each of the categories.

6. The electronic apparatus of claim 5, wherein the processor is configured to:
for each category of the categories, obtain a ratio of a number of the object regions in each category to a total number of the object regions, and
identify the levels of importance so that a highest level of importance is identified for object regions in a category of the categories having the highest ratio.

7. The electronic apparatus of claim 1, wherein the levels of importance are based on categories of objects included in the object regions, and the processor is configured to identify the levels of importance based on a user input selecting at least one of the categories.

8. The electronic apparatus of claim 7, wherein the processor is configured to:
identify the level of importance of the at least one of the categories to be higher than the levels of importance of the other categories.

9. The electronic apparatus of claim 3, wherein, to identify the arrangement of the first image, the processor is configured to:

reduce or enlarge the first image based on a size of each region of the plurality of regions, while maintaining an aspect ratio of the first image, and in response to an aspect ratio of each region of the plurality of regions being different from the aspect ratio of the first image, in arranging a portion of the first image corresponding to a size of each region of the plurality of regions, from the reduced or enlarged first image, in each region of the plurality of regions, identify the arrangement of the first image so that a degree of loss of the at least one object region included in the first image is minimized in accordance with interest values of the first image.

10. A method comprising, by an electronic apparatus:

identifying an arrangement of a plurality of images for a plurality of regions that are divided according to a predetermined layout; and displaying the plurality of images in the plurality of regions based on the identified arrangement and/or transmitting data for displaying, by an external device, the plurality of images in the plurality of regions based on the identified arrangement, wherein the plurality of images include object regions, and the identifying the arrangement of the plurality of images comprises identifying the arrangement of the plurality of images based on a degree of loss of each image in each region, taken together for all the images, wherein the degree of loss of each image in each region is based on interest values of the image that reflect levels of importance of each object region in the image.

11. The method of claim 10, wherein the identifying the arrangement of the plurality of images comprises:

identifying the arrangement of the plurality of images so that the degree of loss of each image in each region, taken together for all the images, is minimized.

12. The method of claim 11, wherein a first image of the plurality of images includes at least one object region, and the identifying the arrangement of the plurality of images comprises:

identifying an arrangement of the first image in each region of the plurality of regions so that, in each region, the degree of loss of the at least one object region included in the first image is minimized in accordance with interest values of the first image, and identifying the arrangement of the plurality of images based on the identified arrangement of the first image.

13. The method of claim 12, wherein a second image of the plurality of images includes at least one object region, and the identifying the arrangement of a plurality of images comprises:

identifying an arrangement of the second image in each region of the plurality of regions so that, in each region, the degree of loss of the at least one object region included in the second image is minimized in accordance with interest values of the second image, and identifying the arrangement of the plurality of images based on the identified arrangement of the second image.

14. The method of claim 10, wherein the levels of importance are based on categories of objects included in the object regions, and the identifying the arrangement of the plurality of images comprises identifying the levels of importance of the object regions based on a number of object regions corresponding to each of the categories.

15. The method of claim 14, wherein the identifying the arrangement of the plurality of images comprises:

for each category of the categories, obtaining a ratio of a number of the object regions in each category to a total number of the object regions, and identifying the levels of importance so that a highest level of importance is identified for object regions in a category of the categories having the highest ratio.

16. The method of claim 10, wherein the levels of importance are based on categories of objects included in the object regions, and the identifying the arrangement of the plurality of images comprises identifying the levels of importance based on a user input selecting at least one of the categories.

17. The method of claim 16, wherein the identifying the arrangement of the plurality of images comprises:

identifying the level of importance of the at least one of the categories to be higher than the levels of importance of the other categories.

18. The method of claim 12, wherein the identifying the arrangement of the plurality of images comprises:

reducing or enlarging the first image based on a size of each region of the plurality of regions, while maintaining an aspect ratio of the first image, and in response to an aspect ratio of each region of the plurality of regions being different from the aspect ratio of the first image, in arranging a portion of the first image corresponding to a size of each region of the plurality of regions, from the reduced or enlarged first image, in each region of the plurality of regions, identifying the arrangement of the first image so that a degree of loss of the at least one object region included in the first image is minimized in accordance with interest values of the first image.

19. A non-transitory computer readable medium storing computer instructions that, when executed by a processor of an electronic apparatus, cause the electronic apparatus to perform a process comprising:

identifying an arrangement of a plurality of images for a plurality of regions that are divided according to a predetermined layout; and displaying the plurality of images in the plurality of regions based on the identified arrangement and/or transmitting data for displaying, by an external device, the plurality of images in the plurality of regions based on the identified arrangement, wherein the plurality of images include object regions, and the identifying the arrangement of the plurality of images comprises identifying the arrangement of the plurality of images based on a degree of loss of each image in each region, taken together for all of the images, wherein the degree of loss of each image in each region is based on interest values of the image that reflect levels of importance of each object region in the image.

\* \* \* \* \*